(12) United States Patent
Wu et al.

(10) Patent No.: US 11,650,481 B2
(45) Date of Patent: May 16, 2023

(54) DRIVING MECHANISM FOR OPTICAL ELEMENT

(71) Applicant: TDK TAIWAN CORP., Taoyuan (TW)

(72) Inventors: Fu-Yuan Wu, Taoyuan (TW);
Shang-Yu Hsu, Taoyuan (TW);
Yu-Huai Liao, Taoyuan (TW);
Meng-Ting Lin, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 399 days.

(21) Appl. No.: 16/773,454

(22) Filed: Jan. 27, 2020

(65) Prior Publication Data

US 2021/0051271 A1 Feb. 18, 2021

Related U.S. Application Data

(60) Provisional application No. 62/887,905, filed on Aug. 16, 2019.

(30) Foreign Application Priority Data

Dec. 20, 2019 (EP) ..................................... 19218896

(51) Int. Cl.
*G02B 7/08* (2021.01)
*G02B 27/64* (2006.01)
(Continued)

(52) U.S. Cl.
CPC .............. *G03B 5/00* (2013.01); *G02B 7/021* (2013.01); *G02B 7/08* (2013.01); *G02B 7/09* (2013.01); *G02B 7/10* (2013.01); *G02B 9/62* (2013.01); *G02B 13/001* (2013.01); *G02B 13/0065* (2013.01); *G02B 27/646* (2013.01); *G03B 13/36* (2013.01); *H04N 5/2253* (2013.01); *H04N 5/2254* (2013.01); *H04N 5/2257* (2013.01);
(Continued)

(58) Field of Classification Search
CPC .. G03B 5/00; G03B 13/36; G03B 2205/0007; G03B 2205/0053; G03B 2205/0069; G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS

2005/0243442 A1\* 11/2005 Yabe .................. G11B 7/08505
2018/0173081 A1\* 6/2018 Kim ....................... G03B 13/36
(Continued)

*Primary Examiner* — Marin Pichler
(74) *Attorney, Agent, or Firm* — Muncy, Geissler, Olds & Lowe, P.C.

(57) ABSTRACT

An optical element driving mechanism is provided, including a fixed portion, a movable portion, a driving assembly, and a connecting assembly. The fixed portion includes a base and a case. The movable portion is movable relative to the fixed portion and is used for connecting an optical element. The driving assembly is disposed between the fixed portion and the movable portion for moving the movable portion relative to the fixed portion. The connecting assembly is disposed between the fixed portion and the movable portion.

18 Claims, 11 Drawing Sheets

(51) Int. Cl.
  *H04N 5/225*  (2006.01)
  *H04N 5/232*  (2006.01)
  *G03B 5/00*  (2021.01)
  *G02B 9/62*  (2006.01)
  *G02B 7/09*  (2021.01)
  *G02B 13/00*  (2006.01)
  *G02B 7/02*  (2021.01)
  *G03B 13/36*  (2021.01)
  *G02B 7/10*  (2021.01)

(52) U.S. Cl.
  CPC . *H04N 5/23287* (2013.01); *G03B 2205/0007* (2013.01); *G03B 2205/0053* (2013.01); *G03B 2205/0069* (2013.01)

(56) References Cited

U.S. PATENT DOCUMENTS

2018/0246293 A1* 8/2018 Lim .......................... G02B 7/09
2021/0231904 A1* 7/2021 Son ......................... G03B 30/00

\* cited by examiner

DRIVING MECHANISM FOR OPTICAL ELEMENT

CROSS REFERENCE TO RELATED APPLICATIONS

This application claims the benefit of U.S. Provisional Application No. 62/887,905, filed on Aug. 16, 2019, and European Patent Application No. 19218896.9, filed on Dec. 20, 2019, the entireties of which are incorporated by reference herein.

BACKGROUND OF THE INVENTION

Field of the Invention

The present disclosure relates to an optical element driving mechanism.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF INVENTION

An optical element driving mechanism is provided, including a fixed portion, a movable portion, a driving assembly, and a connecting assembly. The fixed portion includes a base and a case. The movable portion is movable relative to the fixed portion and is used for connecting an optical element. The driving assembly is disposed between the fixed portion and the movable portion for moving the movable portion relative to the fixed portion. The connecting assembly is disposed between the fixed portion and the movable portion.

In some embodiments, a receiving space is formed between the base and the case, and the movable portion and the driving assembly are disposed in the receiving space. In some embodiments, the connecting assembly directly connects the base to the movable portion. In some embodiments, the optical element driving mechanism further includes a position-sensing element disposed between the movable portion and the base, and the driving assembly surrounds the position assembly.

In some embodiments, the case has an opening, the movable portion has a connecting rod extending along a first direction and passing through the opening, and the connecting rod is used for connecting the opening element. In some embodiments, the diameter of the opening is greater than the diameter of the connecting rod. In some embodiments, the base includes a recessed portion, and a sidewall of the recessed portion overlaps the movable portion when viewed from the first direction. In some embodiments, the movable portion includes a first recess extending in the first direction. In some embodiments, the base includes a second recess extending in the first direction.

In some embodiments, the first recess and the second recess at least partially overlap each other when viewed from a second direction that is perpendicular to the first direction. In some embodiments, the movable portion further includes two third recesses that extend in the first direction, the base further includes two fourth recesses that extend in the first direction, and the third recesses and the fourth recesses at least partially overlap each other when viewed in a second direction that is perpendicular to the first direction. In some embodiments, the length of the first recess is greater than the length of any of the third recesses. In some embodiments, the length of the second recess is greater than the length of any of the fourth recesses. In some embodiments, the first recess extends along an extending line, and the third recesses are symmetrical to the extending line.

In some embodiments, the connecting assembly is disposed in the first recesses and the second recess concurrently. In some embodiments, the length of the first recess is identical to the length of the second recess. In some embodiments, the movable portion includes two recesses, and the opening directions of the recesses are opposite.

In some embodiments, the connecting assembly includes a first connecting element and a second connecting element, wherein both the first connecting element and the second connecting element are spherical, and the diameter of the first connecting element is different than the diameter of the second connecting element. In some embodiments, the connecting assembly further includes another first connecting element, and the second connecting element is disposed between the two first connecting elements. In some embodiments, the diameter of the second connecting element is less than the diameter of any of the first connecting elements.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
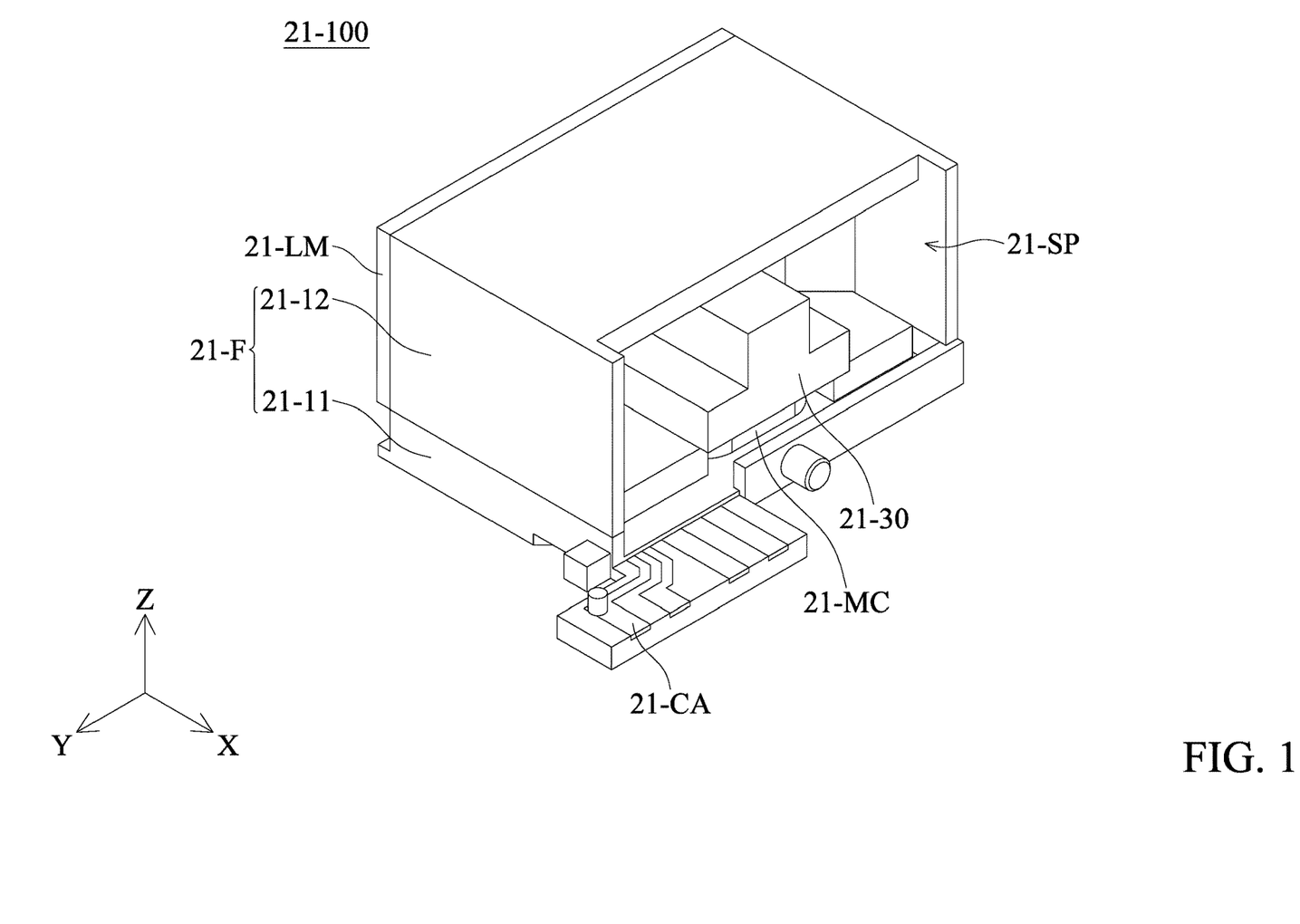
FIG. 1 is a schematic view of an optical element driving mechanism in some embodiments of the present disclosure.

Referring to FIG. 1, FIG. 1 is a schematic view showing the optical element driving mechanism 21-100. The optical element driving mechanism 21-100 can be used, for example, to drive and sustain an optical element 21-LM (such as a reflector lens or mirror), and can be disposed inside a camera module of an electronic device (such as a camera, a tablet or a mobile phone), as shown in FIG. 1. When light (incident light) from the outside enters the camera module, by the optical element 21-LM driven via the optical element driving mechanism 21-100, the light can be changed from the original incident direction, and the angle direction thereof can be adjusted to enter the optical lens in the camera module, and the light can pass through the optical lens to an photosensitive element (such as image sensor) to obtain an image. With the above configuration, the thickness of the camera module of the electronic device in the Z-axis direction can be greatly saved, so as to achieve miniaturization. The detailed structure of the optical element driving mechanism 21-100 will be described below.

Figure 2:
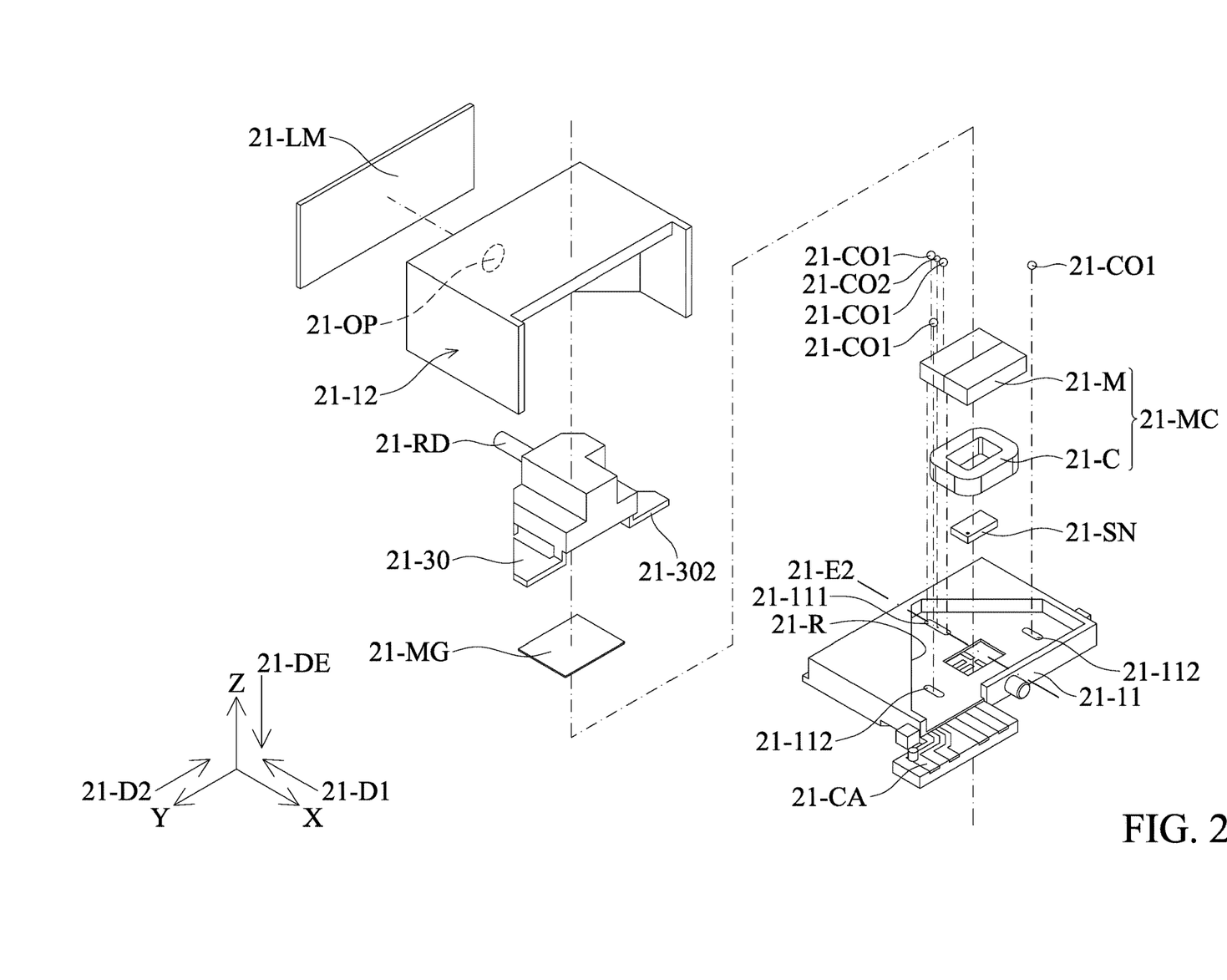
FIG. 2 is an exploded view of the optical element driving mechanism in FIG. 1.

Referring to FIGS. 1 and 2, wherein FIG. 1 is an exploded view of the optical element driving mechanism 21-100, which includes a fixed portion 21-F, a movable portion 21-30, a driving assembly 21-MC and a connecting assembly 21-CO. The fixed portion 21-F includes a base 21-11 and a case 21-12. The case 21-12 is connected to and disposed on the base 21-11 to form a receiving space 21-SP which is configured to accommodate receive the movable portion 21-30 and the driving assembly 21-MC for protection. A connecting rod 21-RD of the movable part 21-30 can be connected to an optical element 21-LM, and the movable portion 21-30 is located over the base 21-11 and is movably connected to the case 21-12 through the connecting assembly 21-CO. The driving assembly 21-MC is disposed between the base 21-11 and the movable portion 21-30, and is configured to drive the movable portion 21-30 relative to the base 21-11 and the case 21-12 to move, to adjust the position of the optical element, thereby achieving the purpose of optical auto-focusing (AF) or optical image stabilization (OIS).

Figure 3:
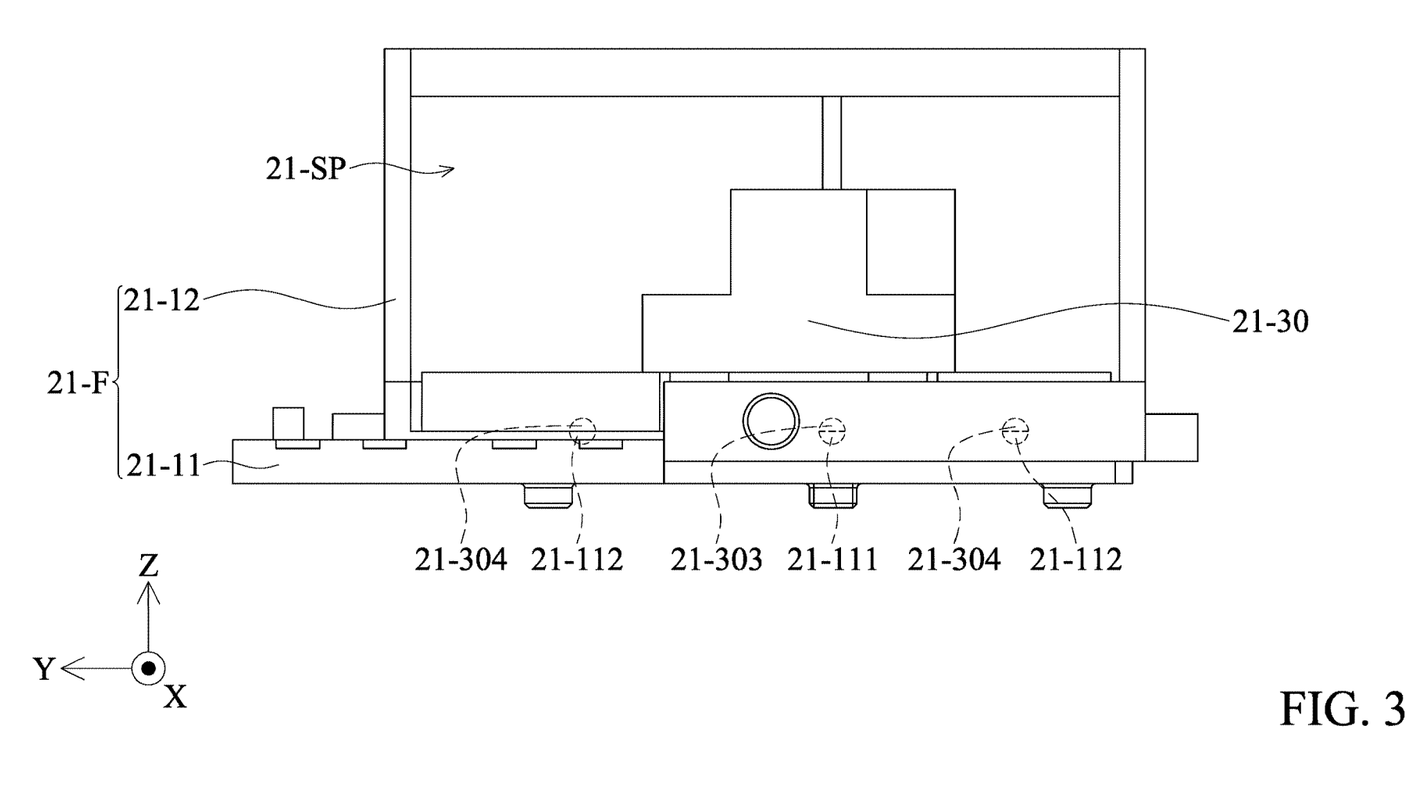
FIG. 3 is a front view of the optical element driving mechanism in FIG. 1.
Figure 4A:
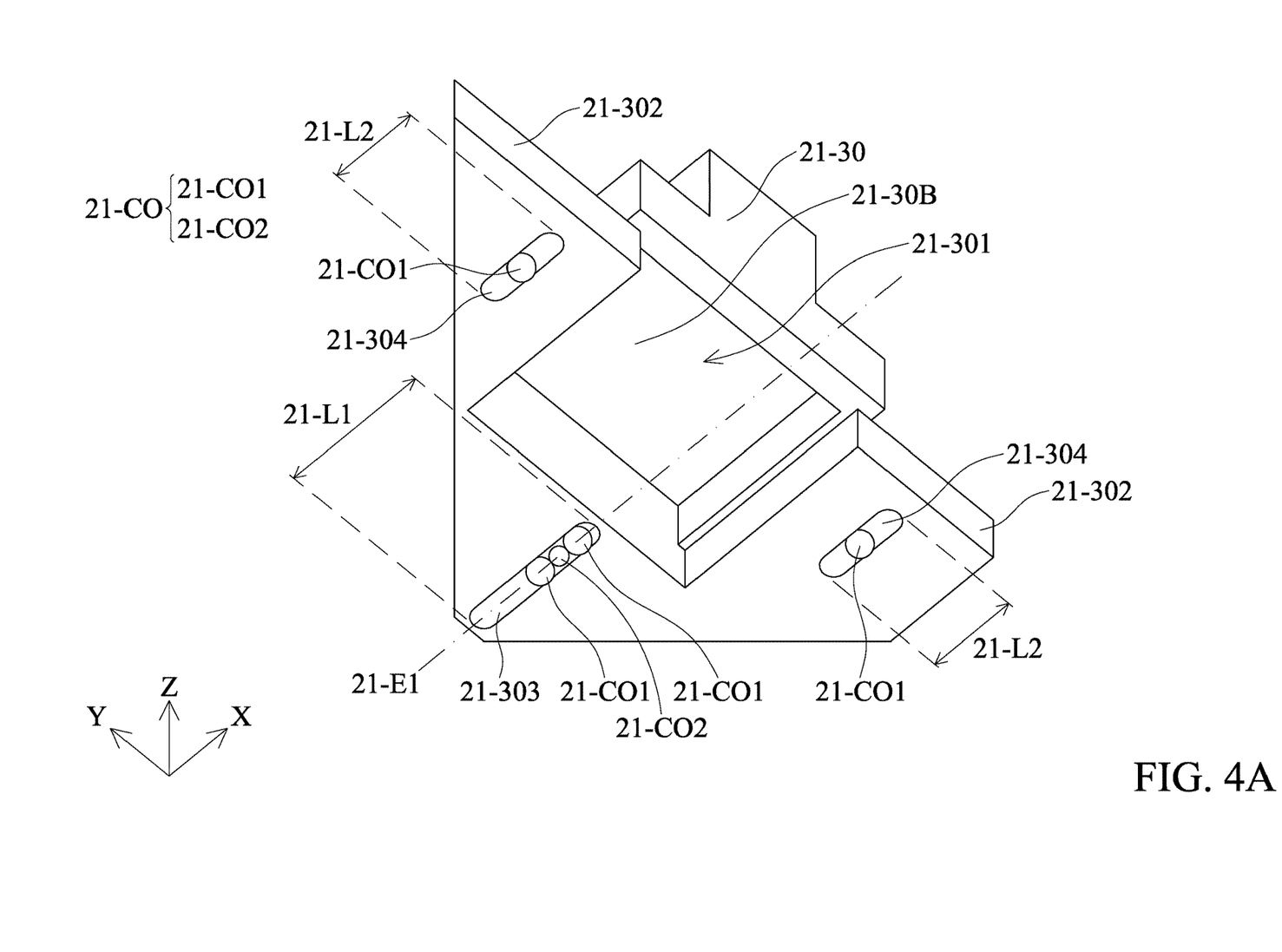
FIG. 4A is a schematic view of the movable portion and the connecting element.
Figure 4B:
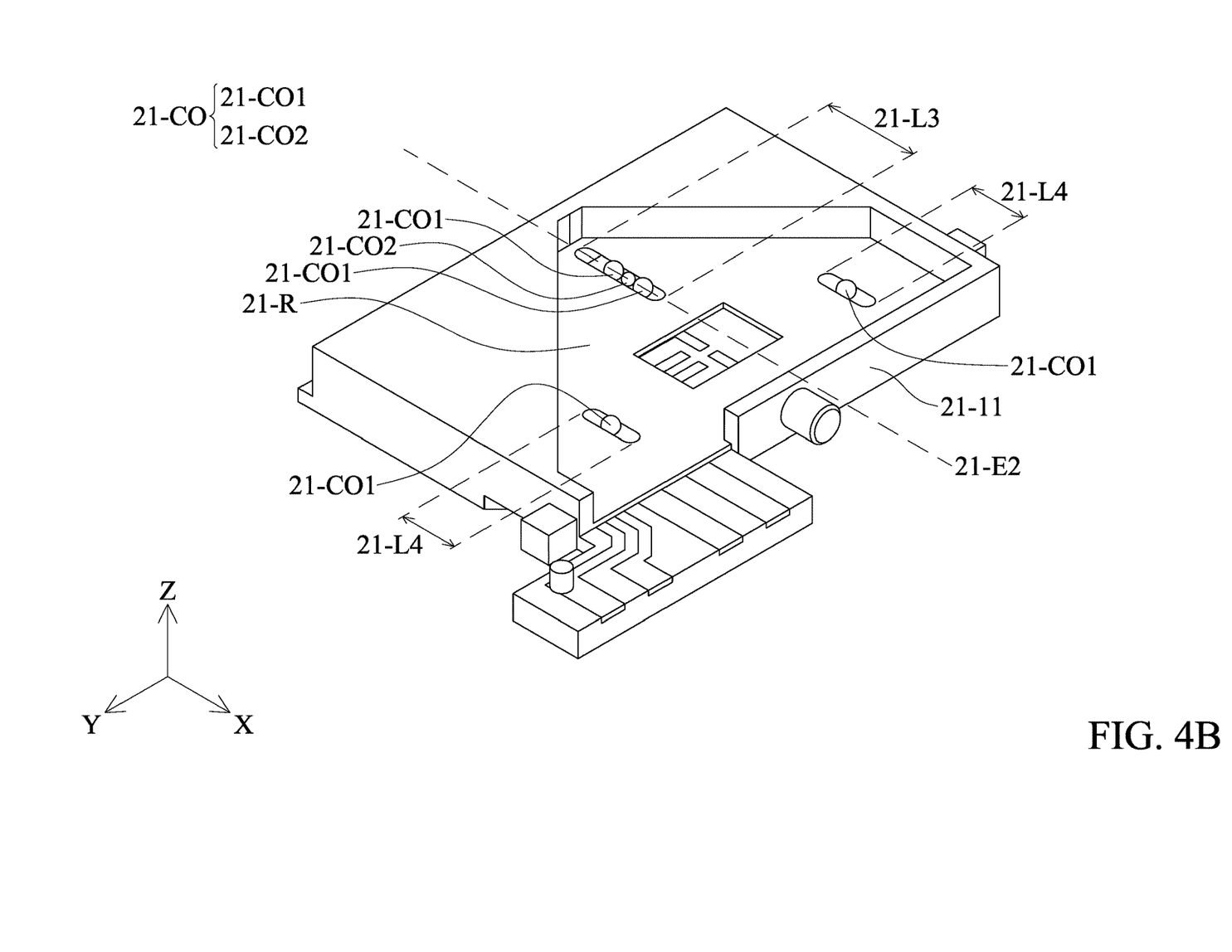
FIG. 4B is a schematic view of the base and the connecting element.
Figure 5A:
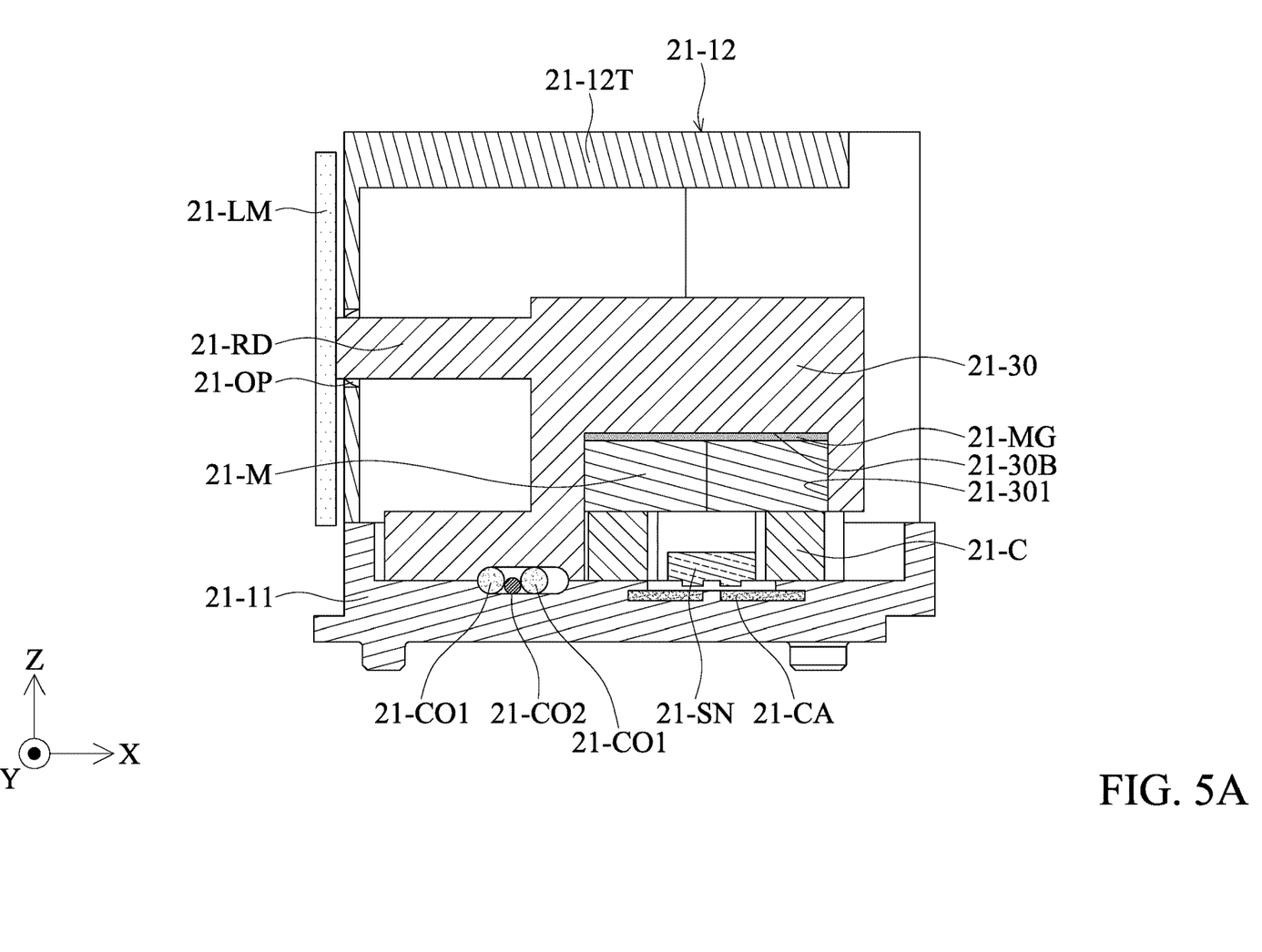
FIGS. 5A and 5B are schematic views of the optical element driving mechanism viewed from different directions when the optical element driving mechanism is operating, in some embodiments of the present disclosure.

Referring to FIGS. 3, 4A and 4B, The movable portion 21-30 has an extended connection portion 21-302 which is adjacent to the base 21-11 and away from the upper shell 21-12T of the case 21-12 (FIG. 5A). In addition, the base 21-11 has a recessed portion 21-R. Seen from the extension direction 21-DE, the movable portion 21-30 is located above the recessed portion 21-R. Seen from the first or second direction 21-D1, 21-D2, the sidewall of the recessed portion 21-R overlaps the movable portion 21-30, which helps to limit the movement of the movable portion 21-30.

The connecting assembly 21-CO may be disposed between the base 21-11 and the movable portion 21-30. As shown in FIG. 4A, a first recess 21-303 and two second recesses 21-304 may be positioned at the bottom of the movable portion 21-30, and the first recess 21-303 and the third recesses 21-304 may extend along a first direction 21-D1 (X axis) for accommodating the connecting assembly 21-CO. The connecting assembly 21-CO may reduce the friction between the base 21-11 and the movable portion 21-30. Furthermore, because the first recess 21-303 and the third recesses 21-304 extend along the first direction 21-D1 (X axis), the connecting assembly 21-CO may roll in the first recess 21-303 and the third recesses 21-304, to allow the movable portion 21-30 to move relative to the base 21-11 (a portion of the fixed portion 21-F) in the first direction 21-D1, and the optical element 21-LM connected to the movable portion 21-30 may be driven. In other words, the connecting assembly directly connects the base 21-11 and the movable portion 21-30.

In some embodiments, the length 21-L1 of the first recess 21-303 is greater than the length 21-L2 of any of the third recesses 21-304, to allow more connecting elements (such as two first connecting elements 21-CO1 and one second connecting element 21-CO2 in FIG. 4B) may be disposed in the first recess 21-303. As a result, the friction between the movable portion 21-30 and the base 21-11 may be further decreased.

In some embodiments, the first recess 21-303 extends along a extending line 21-E1, and the two third recesses 21-304 are symmetrical to the extending line 21-E1 for balancing the center of gravity of the movable portion 21-30 when the movable portion 21-30 is disposed on the base 21-11, and the optical element driving mechanism 21-100 may be further stabilized during operation.

The connecting rod 21-RD of the movable portion 21-30 extends along the first direction 21-D1 (X-axis) to connect the optical element 21-LM. The connecting rod 21-RD is connected to the optical element 21-LM through an opening 21-OP of the case 21-12. The opening 21-OP has a greater diameter than the diameter of connecting rod 21-RD.

Referring to FIG. 4B, a second recess 21-111 and two fourth recesses 21-112 may be positioned on the base 21-11, and the second recess 21-111 and the fourth recesses 21-112 may extend along the first direction 21-D1 (X axis) for accommodating the connecting assembly 21-CO. Because the second recess 21-111 and the fourth recesses 21-112 extend along the first direction 21-D1 (X axis), the connecting assembly 21-CO may roll in the second recess 21-111 and the fourth recesses 21-112, to allow the movable portion 21-30 to move relative to the base 21-11 (a portion of the fixed portion 21-F) in the first direction 21-D1, and the optical element 21-LM connected to the movable portion 21-30 may be driven.

In some embodiments, the length 21-L3 of the second recess 21-111 is greater than the length 21-L4 of any of the fourth recesses 21-112, to allow more connecting elements (such as two first connecting elements 21-CO1 and one second connecting element 21-CO2 in FIG. 4B) may be disposed in the second recess 21-111. As a result, the friction between the movable portion 21-30 and the base 21-11 may be further decreased. In some embodiments, the length 21-L3 of the second recess 21-111 may be substantially identical to the length 21-L1 of the first recess 21-303, and the length 21-L4 of the fourth recess 21-112 may be substantially identical to the length 21-L2 of the third recess 21-304.

In some embodiments, the second recess 21-111 extends along a extending line 21-E2, and the two fourth recesses 21-112 are symmetrical to the extending line 21-E2 to balance the center of gravity of the movable portion 21-30 when the movable portion 21-30 is disposed on the base 21-11, and the optical element driving mechanism 21-100 may be further stabilized when operating.

Moreover, in some embodiments, as shown in FIGS. 4B and 5A, the second connecting element 21-CO2 may be disposed between two first connecting elements 21-CO1, and the first connecting element 21-CO1 and the second connecting element 21-CO2 have different diameters. For example, the diameter of the first connecting element 21-CO1 may be greater than the diameter of the second connecting element 21-CO2. As a result, the contact area between the connecting elements may be reduced to decrease the friction when the connecting assembly 21-CO is rolling.

Figure 6A:
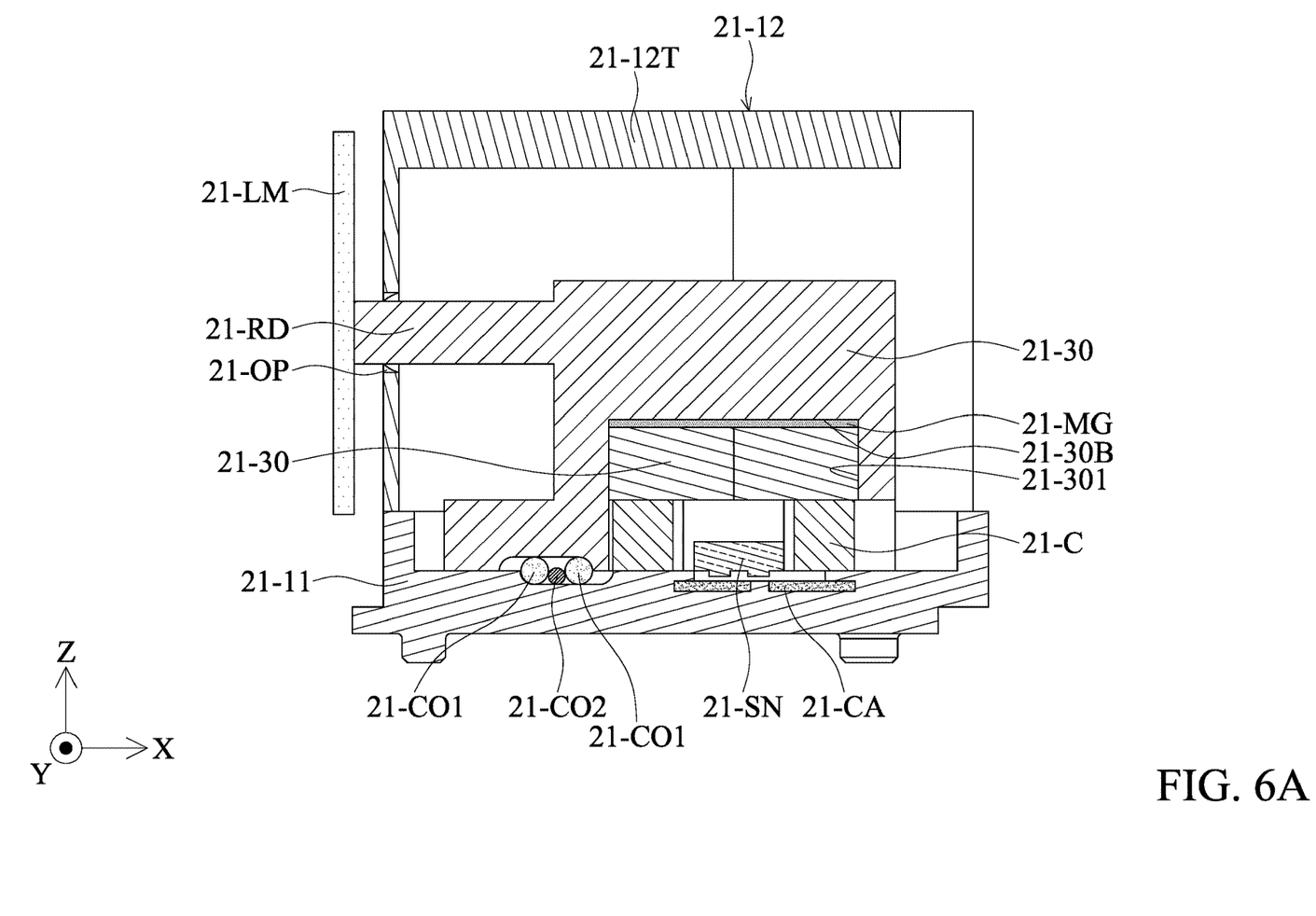
FIGS. 6A and 6B are schematic views of the optical element driving mechanism viewed from different directions when the optical element driving mechanism is operating, in some embodiments of the present disclosure.

Referring to FIGS. 4A, 5A and 6A, the bottom of the movable portion 21-30 further includes a recess (or groove) 21-301, and the opening of the recess 21-301 faces the base 21-11. The aforementioned driving assembly 21-MC is disposed in the recess 21-301. In detail, the driving assembly 21-MC may be an electromagnetic driving assembly, which includes a magnetic element 21-M and a coil 21-C, which are respectively disposed on the bottom surface 21-30B of the movable portion 21-30 and base 21-11. The magnetic element 21-M and the coil 21-C correspond to each other. When a driving signal is applied to the driving component 21-MC (for example, by applying an electric current through an external power source), a magnetic force is generated between the magnetic element 21-M and the coil 21-C to create relative movement between the magnetic element 21-M and the coil 21-C, thereby driving the movable portion 21-30 to move relative the fixed portion 21-F (including base 21-11 and case 21-12) along the direction that the second recess 21-111, the fourth recesses 21-112, and the connecting rod 21-RD extend (i.e. along the X axis), to achieve the effect of anti-shake or auto-focus of optical image. In this embodiment, the driving assembly 21-MC is a moving magnetic type; in another embodiment, it may be a moving coil type.

In this embodiment, the optical element driving mechanism 21-100 includes a permeability element 21-MG disposed between the movable portion 21-30 and the driving assembly 21-MC. In detail, it is located between the bottom surface 21-30B and the magnetic element 21-M, so that the magnetic force of the magnetic element 21-M can be concentrated in a predetermined direction to enhance the magnetic force of the driving assembly 21-MC to drive the movable portion 21-30, and the magnetic interference can be decreased. In another embodiment, the permeability element 21-MG can be embedded in a part of the bottom surface 21-30B of the movable portion 21-30 which is corresponding to the magnetic element 21-M, so that the movable portion 21-30 includes permeability conductive material, and the magnetic element 21-M can be directly contacted and fixed on the bottom surface 21-30B. In addition to strengthening the magnetic force (between the magnetic element 21-M and the coil 21-C) in a predetermined direction, it can also strengthen the overall mechanical strength of the movable portion 21-30.

The optical element driving mechanism 21-100 includes a position-sensing element 21-SN, which may be a position sensor, for example, a magnetoresistive sensor (MRS) or an optical sensor, which is used to sense the relative positional relationship between the movable portion 21-30 and the base 21-11, which facilitates a control unit (not shown) to adjust the positions between the two by the driving assembly 21-MC. It is worth noting that the position-sensing element 21-SN is provided in the hollow portion of the coil 21-C, or that the position-sensing element 21-SN is surrounded by the coil 21-C. This configuration can make full use of space and is good for miniaturization. In this embodiment, the position-sensing element 21-SN can share the magnetic element 21-M with the coil 21-C. In other words, the position-sensing element 21-SN is disposed between the movable portion 21-30 and the base 21-11, and the driving assembly 21-MC surrounds the position-sensing element 21-SN.

A circuit component 21-CA is disposed on the base 21-11, and is used to electrically connect the driving assembly 21-MC and the position-sensing element 21-SN. In this embodiment, the circuit assembly 21-CA is formed by insert molding on the body of the base 21-11. In another embodiment, the base 21-11 may include a circuit board component, such as a printed circuit board (PCB), which is disposed on the body of the base 21-11 and is electrically connected to the driving assembly 21-MC and position-sensing element 21-SN.

Figure 5B:
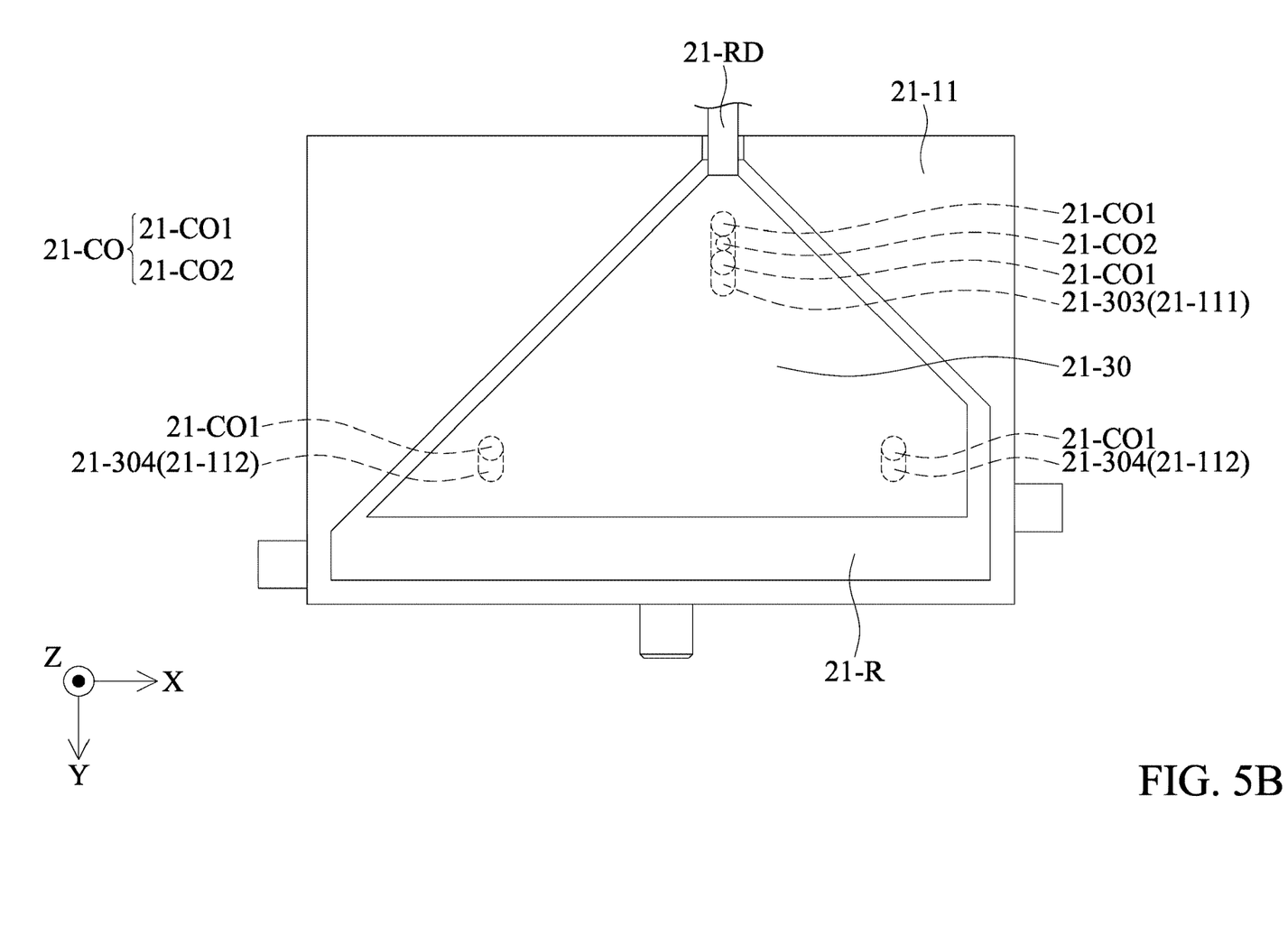
Figure 6B:
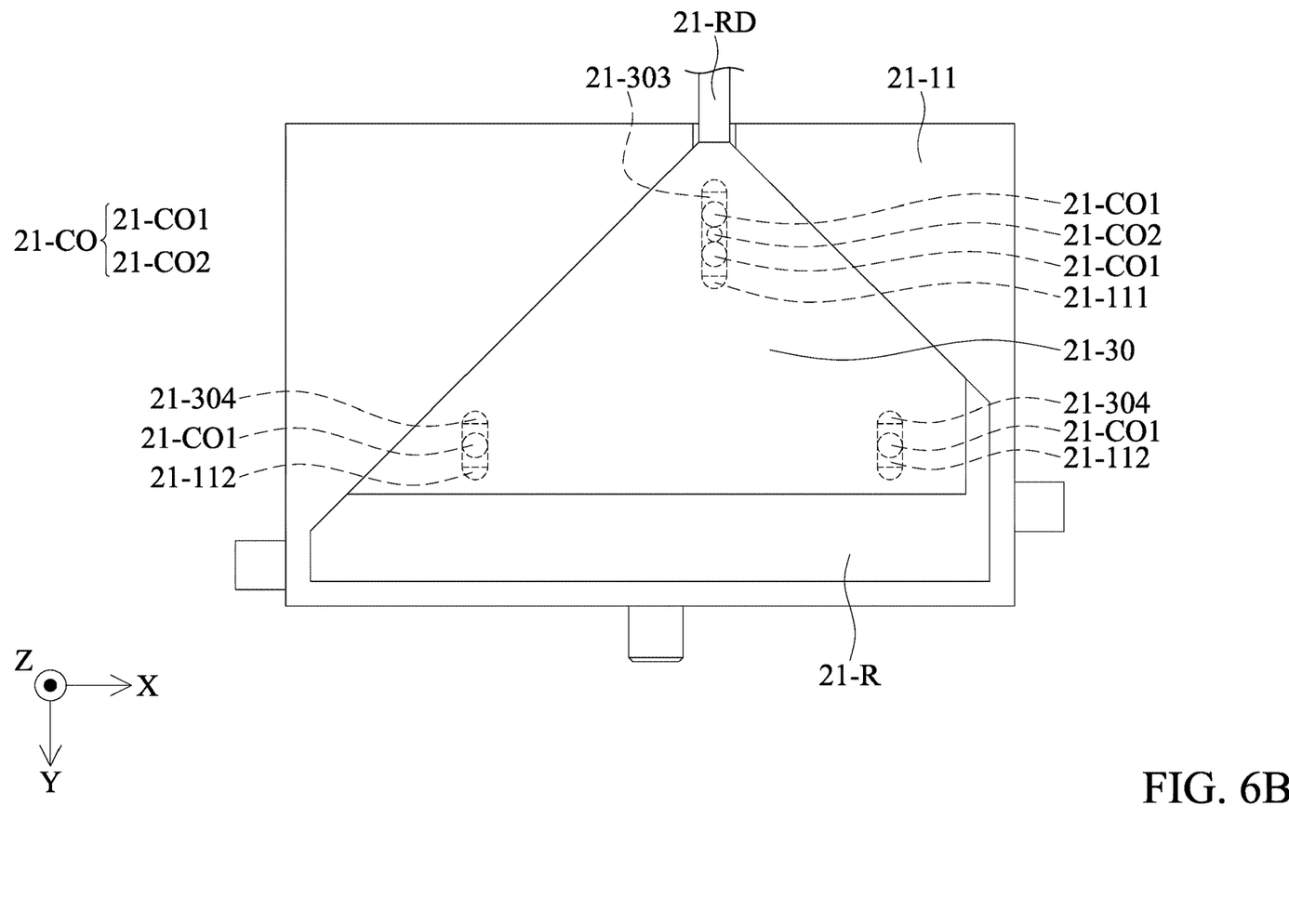

Referring to FIGS. 5A, 5B, 6A and 6B, wherein FIGS. 5A and 6A are cross-sectional views when the movable portion 21-30 moves relative to the fixed portion 21-F, and FIGS. 5B and 6B are top views of the movable portion 21-30 and the fixed portion 21-F in FIGS. 5A and 6A. When the driving assembly 21-MC drives the movable portion 21-30 to move relative to the fixed portion 21-F, the connecting rod 21-RD of the movable portion 21-30 also drives the optical element 21-LM to move relative to the fixed portion 21-F. FIGS. 6A and 6B show that the movable portion 21-30 moves relative to the fixed portion 21-F in the first direction 21-D1 (X-axis), and drives the optical element 21-LM to move in the first direction 21-D1.

It should be noted that as shown in FIG. 5B, when the movable portion 21-30 has not moved relative to the base 21-11, the first recess 21-303 overlaps the second recess 21-111, the third recess 21-304 overlaps the fourth recess 21-112, and the connecting assembly 21-CO is disposed at the positions where the recesses overlap each other. In other words, the connecting assembly 21-CO is disposed in the first recess 21-303 and the second recess 21-111 concurrently, and/or disposed in the third recess 21-304 and the fourth recess 21-112 concurrently. As shown in FIG. 6B, when the movable portion 21-30 moves relative to the base 21-11, the first recess 21-303 at least partially overlaps the second recess 21-111, the third recess 21-304 at least partially overlaps the fourth recess 21-112, and the connecting assembly 21-CO is still disposed at the positions where the recesses overlap each other. In other words, even if the movable portion 21-30 moves relative to the base 21-11, the connecting assembly 21-CO still positions in the recesses to limit the range of moving of the connecting assembly 21-CO.

In this way, the movable portion 21-30 can be movably set over the base 21-11 through the connecting assembly 21-CO, and the movable portion 21-30 is driven by the drive assembly 21-MC to move relative to the base 21-11, so that the optical element 21-LM moves together. By adjusting the incident angle of the reflected light from the optical element 21-LM into the optical lens, it can achieve the effects of optical focusing or optical image stabilization.

Figure 7A:
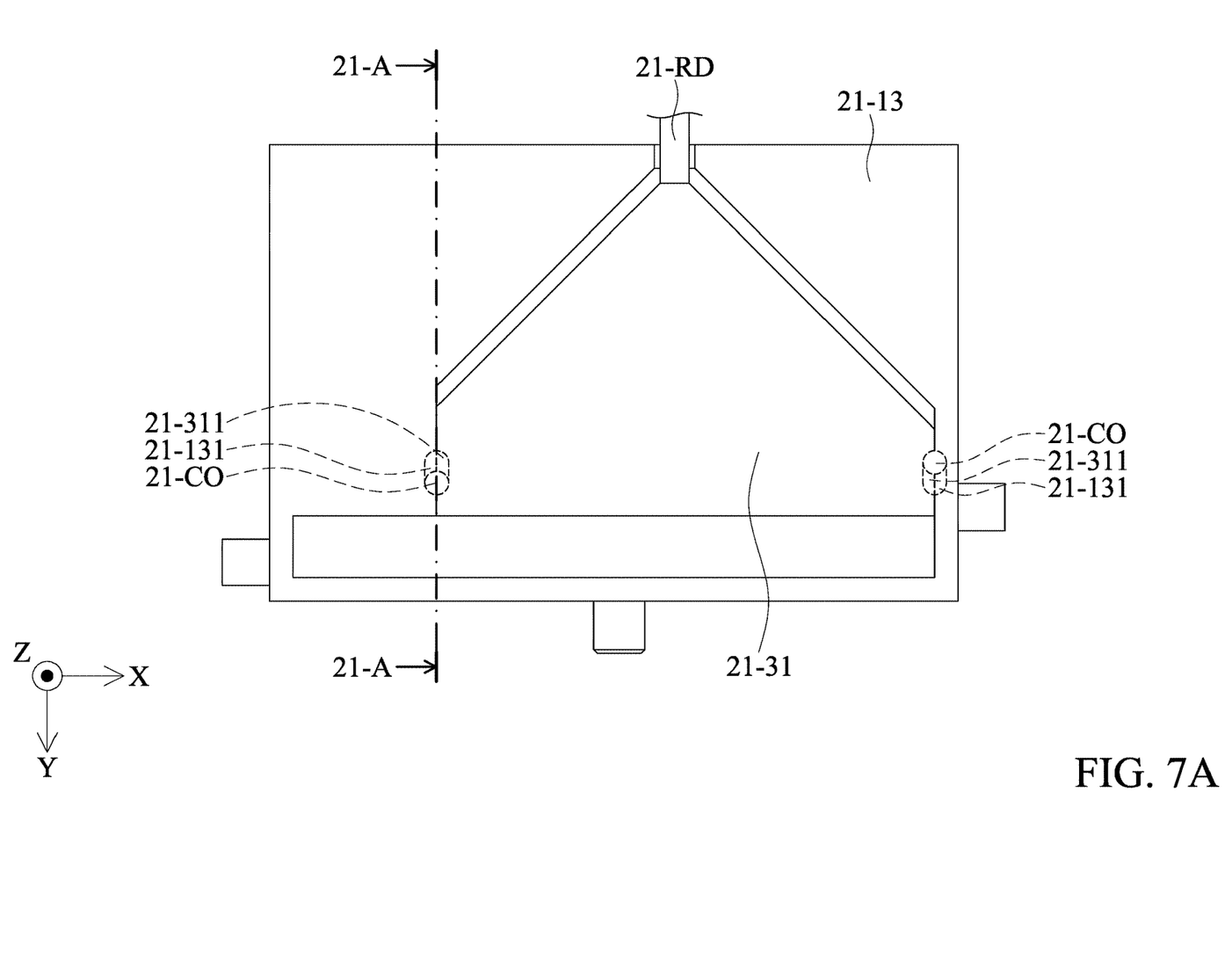
FIG. 7A is a schematic view of an optical element driving mechanism in some embodiments of the present disclosure.
Figure 7B:
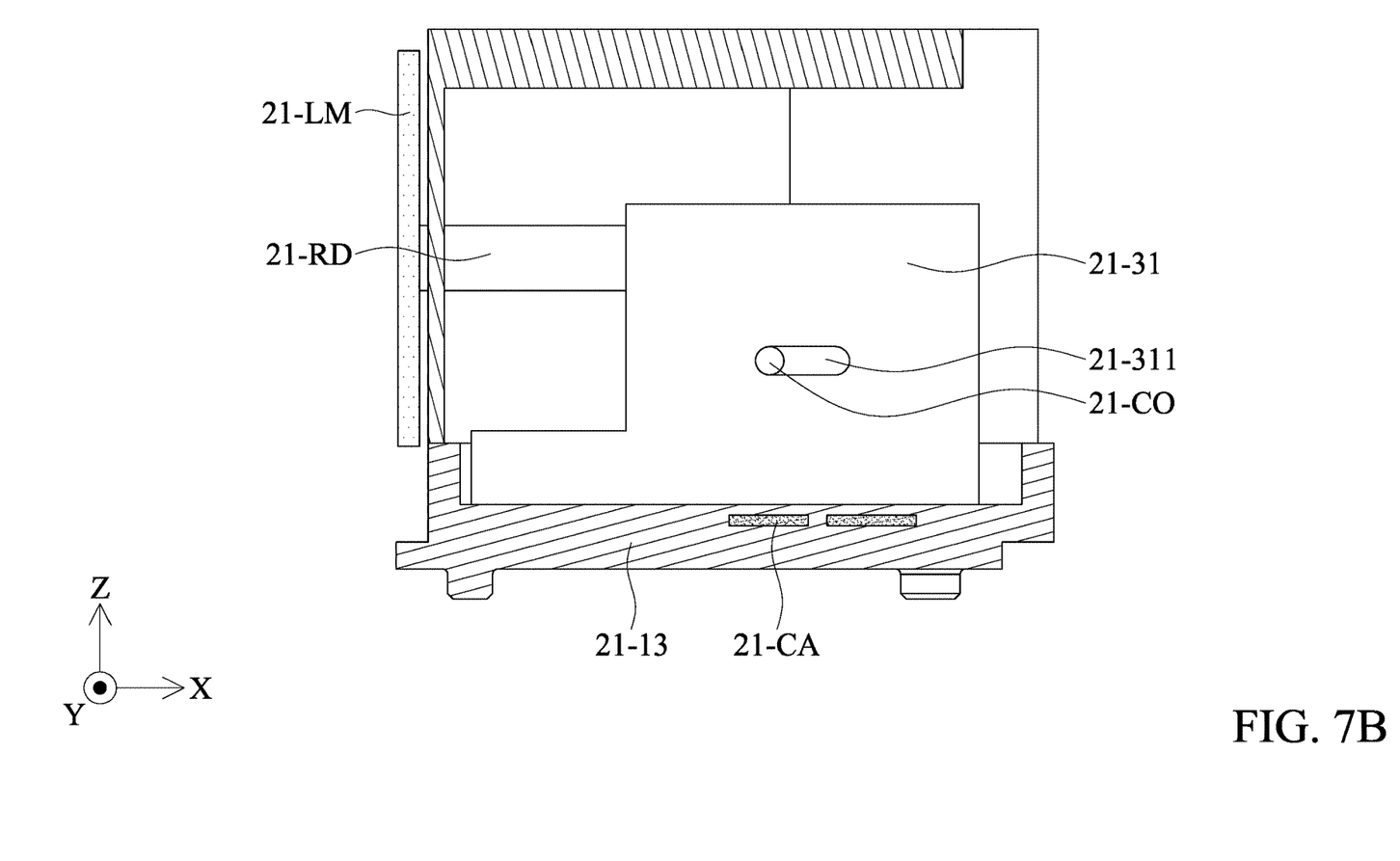
FIG. 7B is a cross-sectional view of an optical element driving mechanism in some embodiments of the present disclosure.

It should be noted that the connecting assembly 21-CO may be disposed not only on the bottom of the movable portion 21-30, but also on the sides of the movable portion. For example, FIG. 7A is a schematic view of a base 21-13, a movable portion 21-31, and the connecting assembly 21-CO in other embodiments of the present disclosure, and FIG. 7B is a cross-sectional view illustrated along the line 21-A-21-A in FIG. 7A. Recesses 21-311 may be positioned at the sides of the movable portion 21-30, the base 21-13 has recesses 21-131 that are positioned corresponding to the recesses 21-311, and the connecting assembly 21-CO may be disposed in the recesses 21-311 and the recesses 21-131. As a result, the friction between the movable portion 21-31 and the base 21-13 may also be reduced. It should be noted that the opening directions of the two recesses 21-311 on the movable portion 21-30 are opposite, and the opening directions of the two recesses 21-131 on the base 21-13 are also opposite.

In summary, an optical element driving mechanism is provided, including a fixed portion, a movable portion, a driving assembly, and a connecting assembly. The fixed portion includes a base and a case. The movable portion is movable relative to the fixed portion and is used for connecting an optical element. The driving assembly is disposed between the fixed portion and the movable portion for moving the movable portion relative to the fixed portion. The connecting assembly is disposed between the fixed portion and the movable portion.

The embodiment of the present invention has at least one of the following advantages or effects, in that the movable portion is disposed on the base in a movable manner through the connecting assembly, and the movable portion is driven to move with the optical element together relative to the base by the driving assembly, to adjust the incident angle of the light reflected by the optical element into the optical lens, the effects of optical focusing and optical image stabilization can be achieved. By connecting the movable portion and the base through the connecting assembly, as compared with setting a suspension movable frame, the embodiment of the present invention can greatly reduce the space occupied by the suspension component inside the driving mechanism, and is conducive to miniaturization. Furthermore, due to the lightness and flexibility of the connecting assembly, the sensitivity and accuracy of the movable portion can be improved when it is moving, thereby increasing the accuracy of moving the optical element.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion, comprising a base and a case, wherein the case has an opening;
a movable portion that is movable relative to the fixed portion, and is used for connecting to an optical element, wherein the movable portion comprises:
a connecting rod extending along a first direction and passing through the opening, wherein the connecting rod is used for connecting the optical element through the opening of the case;
a first recess extending in the first direction and recessing on a bottom surface of the movable portion, wherein the bottom surface faces the base; and
a plurality of third recesses extending in the first direction and recessing on the bottom surface of the movable portion;
a driving assembly disposed between the fixed portion and the movable portion for driving the movable portion to move relative to the fixed portion; and
a connecting assembly disposed between the fixed portion and the movable portion.

2. The optical element driving mechanism as claimed in claim 1, wherein a receiving space is formed between the base and the case, and the movable portion and the driving assembly are disposed in the receiving space.

3. The optical element driving mechanism as claimed in claim 1, wherein the connecting assembly directly connects the base to the movable portion.

4. The optical element driving mechanism as claimed in claim 1, further comprising a position-sensing element disposed between the movable portion and the base, and the driving assembly surrounds the position-sensing element.

5. The optical element driving mechanism as claimed in claim 1, wherein a diameter of the opening is greater than a diameter of the connecting rod.

6. The optical element driving mechanism as claimed in claim 1, wherein the base comprises a recessed portion, and a sidewall of the recessed portion overlaps the movable portion when viewed from the first direction.

7. The optical element driving mechanism as claimed in claim 1, wherein the base includes a second recess extending in the first direction.

8. The optical element driving mechanism as claimed in claim 7, wherein the first recess and the second recess at least partially overlap each other when viewed from a second direction that is perpendicular to the first direction.

9. The optical element driving mechanism as claimed in claim 8, wherein the base further includes two fourth recesses that extend in the first direction, and the third recesses and the fourth recesses at least partially overlap each other when viewed in the second direction that is perpendicular to the first direction.

10. The optical element driving mechanism as claimed in claim 9, wherein a length of the first recess is greater than a length of any of the third recesses.

11. The optical element driving mechanism as claimed in claim 9, wherein a length of the second recess is greater than a length of any of the fourth recesses.

12. The optical element driving mechanism as claimed in claim 9, wherein the first recess extends along an extending line, and the third recesses are symmetrical to the extending line.

13. The optical element driving mechanism as claimed in claim 7, wherein the connecting assembly is disposed in the first recesses and the second recess concurrently.

14. The optical element driving mechanism as claimed in claim 7, wherein a length of the first recess is identical to a length of the second recess.

15. The optical element driving mechanism as claimed in claim 1, wherein the movable portion includes two recesses, and opening directions of the recesses are opposite.

16. The optical element driving mechanism as claimed in claim 1, wherein the connecting assembly comprises a first connecting element and a second connecting element, wherein both the first connecting element and the second connecting element are spherical, and a diameter of the first connecting element is different than a diameter of the second connecting element.

17. The optical element driving mechanism as claimed in claim 16, wherein the connecting assembly further comprises another first connecting element, and the second connecting element is disposed between the two first connecting elements.

18. The optical element driving mechanism as claimed in claim 17, wherein the diameter of the second connecting element is less than the diameter of any of the first connecting elements.

* * * * *